June 28, 1966  S. H. CAMERON ETAL  3,257,741
SYNTHETIC GUNNERY TRAINER SYSTEM
Filed May 13, 1964  6 Sheets-Sheet 1

INVENTORS
SCOTT H. CAMERON, EUGENE F. URETZ,
WILLIAM A. DAVIDSON, HOWARD T. BETZ,
IRWIN FRIEDLAND
BY
Lawrence S. Epstein
ATTORNEYS

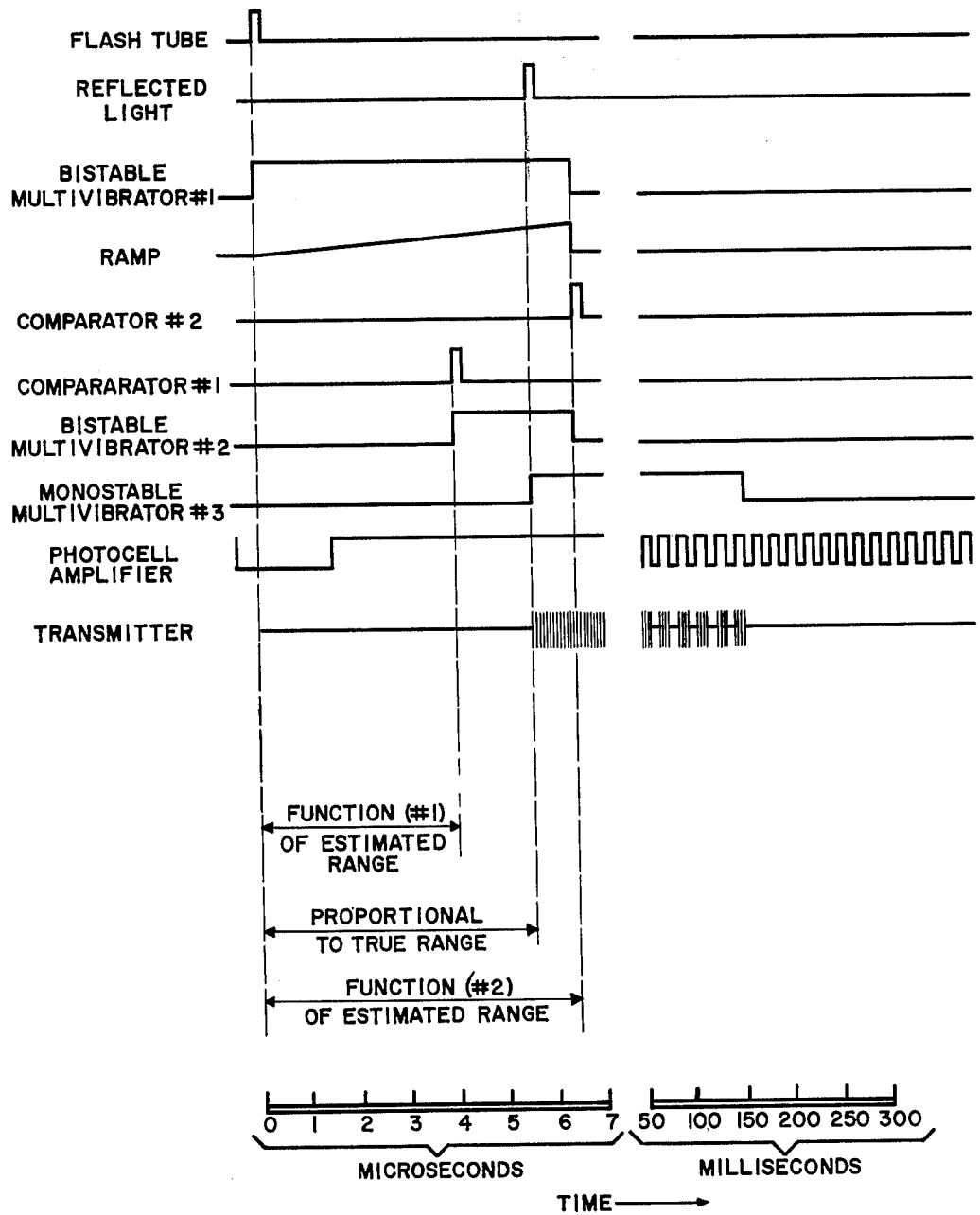
FIG. 2 TIMING RELATIONS IN HIT VERIFIER AND TRANSMITTER

HIT ZONE USED FOR TRAINING PURPOSES
IMPACT POINT LOCI FOR PROJECTILE

United States Patent Office 3,257,741
Patented June 28, 1966

3,257,741
SYNTHETIC GUNNERY TRAINER SYSTEM
Scott H. Cameron, Northfield, Eugene F. Uretz, Chicago, and William A. Davidson, Evanston, Ill., Howard T. Betz, Chesterton, Ind., and Irwin Friedland, Brooklyn, N.Y., assignors, by direct and mesne assignments, to the United States of America as represented by the Secretary of the Navy
Filed May 13, 1964, Ser. No. 367,265
6 Claims. (Cl. 35—25)

The present invention relates to an apparatus for gunnery instruction using simulated ammunition.

An object of the present invention is to provide a novel scoring system for use in a tank gunnery training system.

A further object of the instant invention is to provide a novel scoring system for use in a tank gunnery training system, said scoring system comprising a hit determination subsystem in combination with a hit communication subsystem.

Another object of the instant invention is to provide a novel scoring system for use in a tank gunnery training system, said scoring system being usable with operational targets, tanks, and attacking tanks.

Still another object of the instant invention is to provide a novel scoring system for use in a tank gunnery training system, said scoring system being light in weight and simple and economical to build.

Other objects and many of the attendant advantages of this invention will be readily appreciated as the same becomes better understood by reference to the following detailed description when considered in connection with the accompanying drawings wherein:

FIG. 2 is a wave-form diagram showing the timing relationship between the transmitting and receiving portions of the synthetic tank gunnery training system;

Figure 1A:
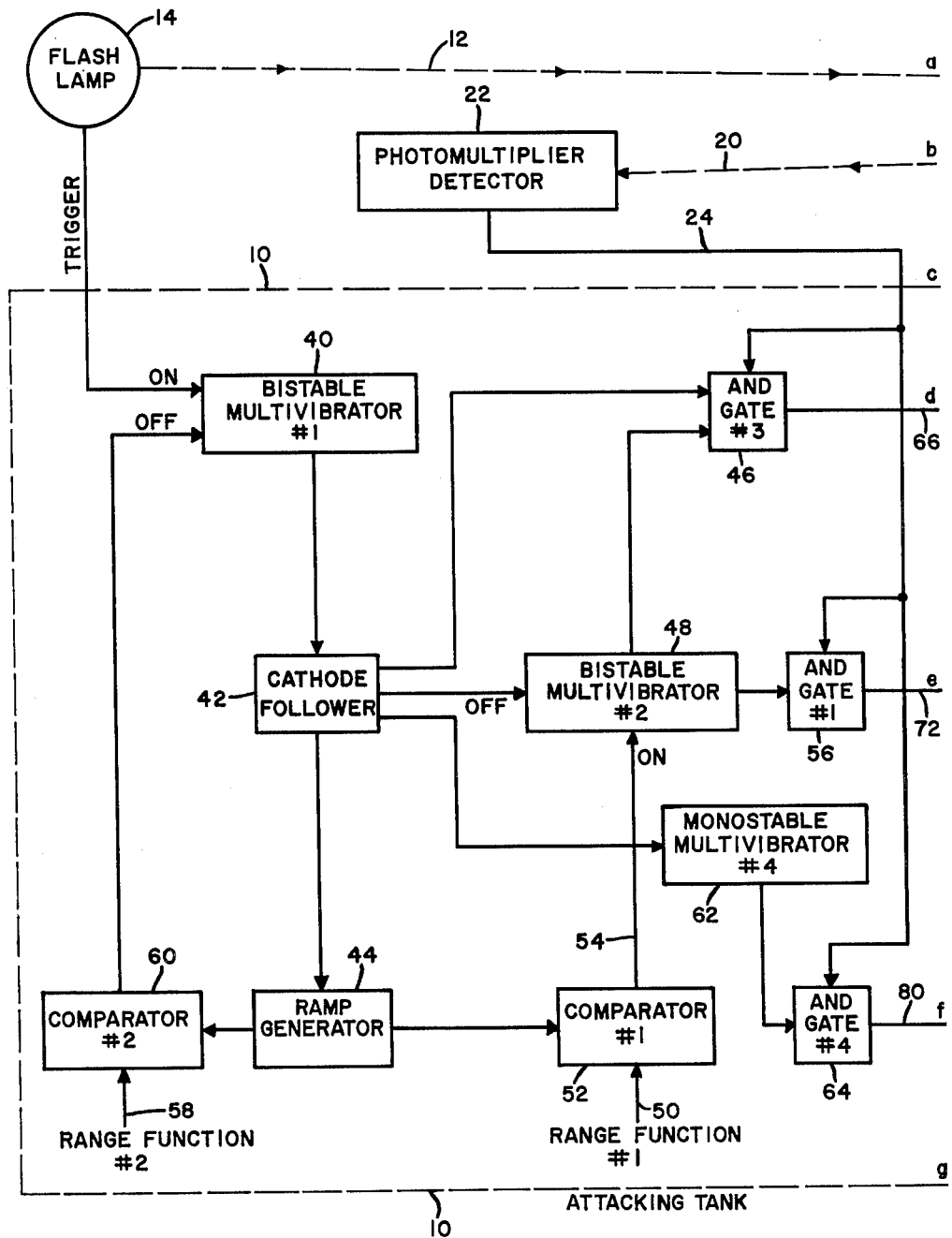
FIGS. 1a, 1b and 1c are overall block schematic diagrams of the synthetic tank gunnery training and scoring system.
Figure 1B:
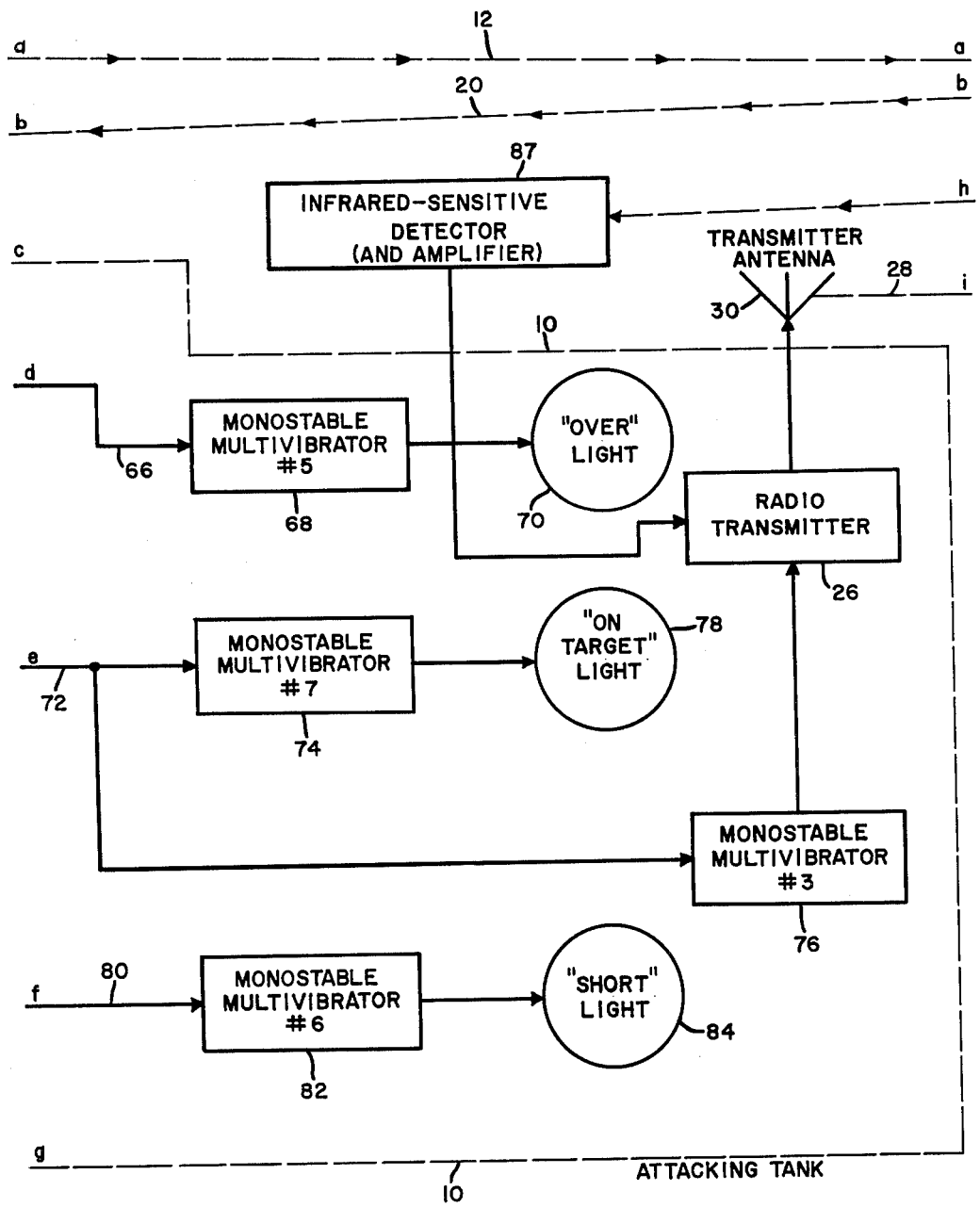
Figure 1C:
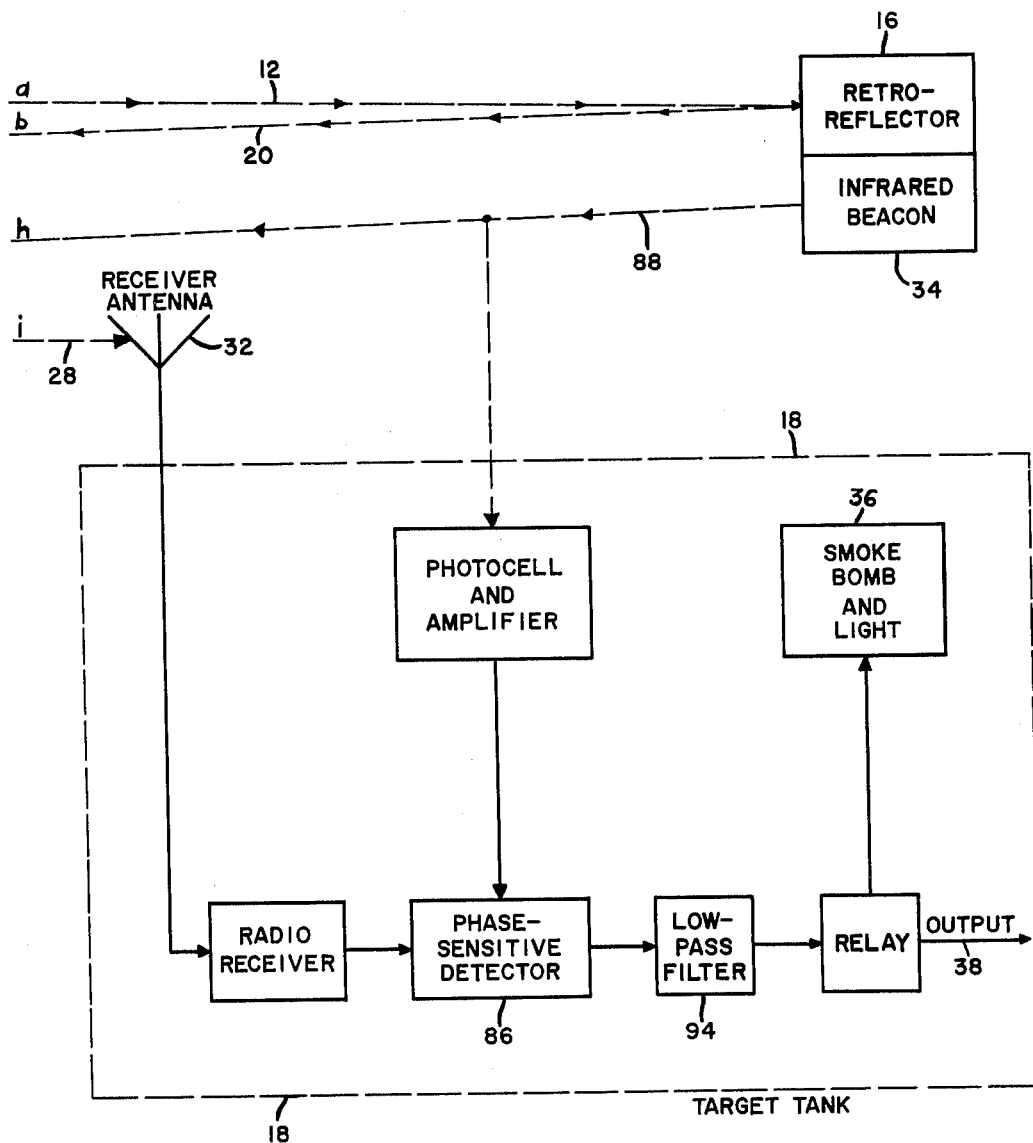

Referring now to FIGS. 1a, 1b and 1c which is a preferred embodiment of the instant invention, when the attacking tank 10 fires, an extremely high energy, short duration, light pulse 12 is initiated by means of a flash lamp 14. This flash lamp 14 produces a narrow angle beam 12 which is boresighted with the gunner's sight. If properly aimed, this light pulse will strike a retroreflector 16 mounted on the target tank 18 and will be reflected back along the line of incidence 20 to a photomultiplier detector 22 on the attacking tank 10 providing an output pulse 24. In order to register a hit the system must receive the reflected light beam 20, thereby producing pulse 24 and must also have the gunner's range estimate correct. Hit registration is determined by comparing the time required for the light pulse from flash lamp 14 to travel to the target tank 18 and back as compared to the time which would be required for the light to travel the distance estimated by the gunner. If the times are within a specified value of each other, a hit is indicated at the attacking tank 10 and a light will flash on for about two seconds indicating "on target." If the light pulse takes longer to return than the gunner's estimated range provides for, a second light will flash on for two seconds indicating "short"; or if the light pulse returns too soon, a third light indicates "over." If either "short" or "over" is indicated, the gunner must re-estimate the range and fire again. If no lights come on after firing, the gunner did not aim properly and must reaim before firing again. Provision is made for presetting the training equipment for a fixed number of firings to make the training more realistic to the participants. If a hit is registered at the attacking tank, the radio transmitter is turned on automatically, and radio transmitter 26 emits a signal 28 from a transmitter antenna 30 to the receiver antenna 32. This signal is modulated by the output of infrared detector 87 which senses the infrared output 88 of infrared beacon 34. Each tank is equipped with an omnidirectional beacon light which is continuously chopped at an audio rate, with a frequency which is different for each tank. Only the tank whose reference signal (derived from its own infrared beacon) is in phase and in frequency with the radio signal 28 will record a hit. Upon the recording of a hit, a smoke bomb 36 will be automatically ignited. An additional output 38 is provided to the target tank which may be used to prevent it from engaging further in the training mission, thus adding more realism to the training activities.

To demonstrate the operation of the hit determination system it will be assumed that the tank commander estimated the range of the target tank at 1,000 yards and that the gun is properly aimed at this target tank. When the gun is fired, the flash lamp 14 sends out a high frequency pulse of light. Discharge of the lamp switches bistable multivibrator 40 to the position which we call "on." The switching of the main elements of the hit determination system are demonstrated on the timing chart shown in FIG. 2. Cathode follower 42 is also switched to an "on" position. This in turn starts the ramp generator 44 which builds up a voltage linearly with time at the rate computed in the design of the preferred embodiment, which is $$8.2 \times 10^6 \frac{\text{volts}}{\text{second}}$$

Figure 3:
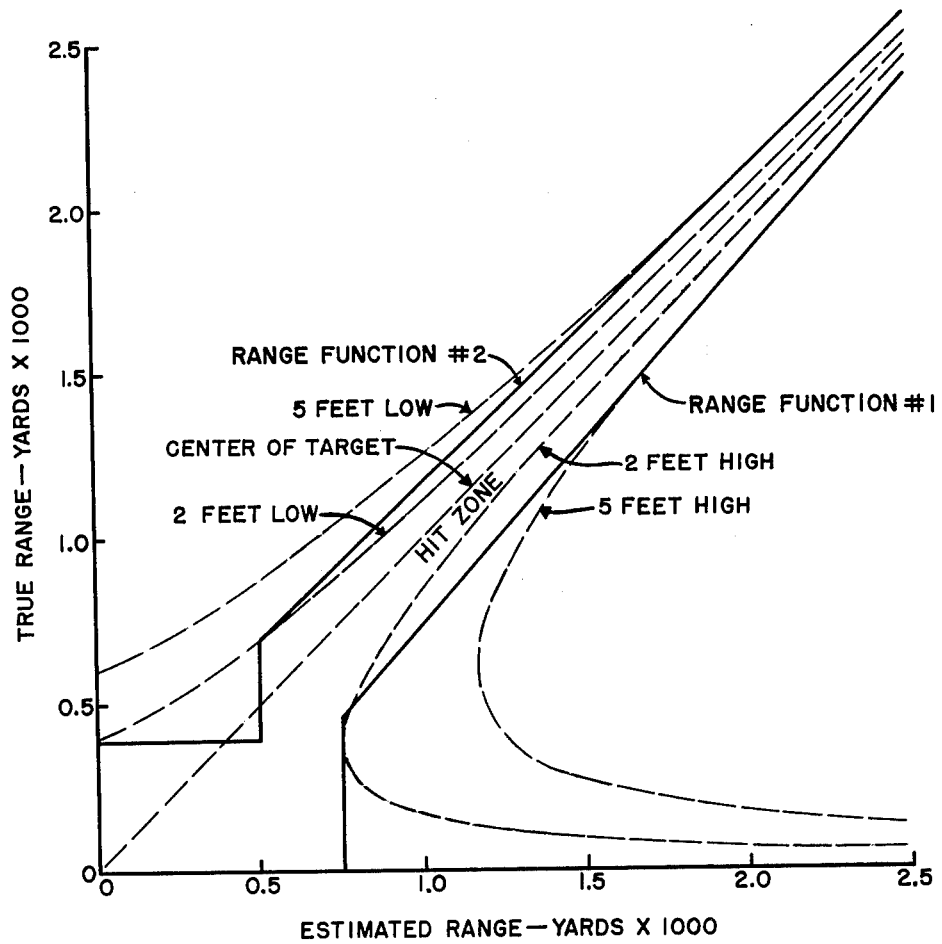
FIG. 3 is a graph showing the hit zones used for training purposes in a preferred embodiment of the invention, the solid lines representing the "Hit Zone For Training Purposes" and the dashed lines representing the "Impact Point Loci For Projectiles."

Since light travels about $3.28 \times 10^8$ yards per second in air and the distance traveled by the light pulse is equal to twice the target range, this ramp rate is equivalent to $$2 \times \frac{8.2 \times 10^6}{3.28 \times 10^8} = 0.05$$

volts per yard of range. The inputs to "AND gate No. three" 46 are the "on" output pulse from bistable multivibrator No. one 40 and the "off" output pulse from bistable multivibrator No. two 48. This combination of inputs makes "AND gate No. three" 46 receptive to a returning light pulse which is relayed to the gate from photomultiplier 22 and its associated amplifier. Since the target range estimated by the tank commander is 1,000 yards, the graph of FIG. 3 shows that in a preferred embodiment of the invention, the range function No. one 50 will correspond to 740 yards and thus be $740 \times 0.05 = 37$ volts. After a time equal to $$\frac{37}{8.2 \times 10^6} = 4.5 \text{ microseconds}$$

comparator No. one 52 will produce a pulse 54. This pulse turns on bistable multivibrator No. two 48. When bistable multivibrator No. two 48 goes on, "AND gate No. one" 56 becomes receptive to the returning light pulse while "AND gate No. three" 46 is no longer receptive. Range function No. two 58 will have a voltage setting which corresponds to 1,170 yards or $1,170 \times 0.05 = 58.5$ volts. After a time equal to $$\frac{58.5}{8.2 \times 10^6} = 7.1 \text{ microseconds}$$

comparator No. two 60 will produce a pulse. This pulse turns off bistable multivibrator No. one 40 and its associated cathode follower 42. When the cathode follower 42 is turned off it turns off bistable multivibrator No. two 48 which makes "AND gate No. one" 56 unreceptive to a light pulse and at the same time it turns on monostable multivibrator No. four 62 which makes "AND gate No. four" 64 receptive to a returning light pulse. Monostable multivibrator No. four 62 remains on for ten microseconds and then goes to the off position which makes "AND gate No. four" 64 unreceptive to a light pulse. It should be noted that of the three "AND gates," 56, 46 and 64, one and only one is receptive to the returning light pulse at any particular instant of time throughout the critical 15 microsecond period following the firing of the simulator. If "AND gate No. three" 46 is in a receptive state when the reflected light pulse from the target is received, the gate puts out a pulse 66 which triggers monostable multivibrator No. five 68 which turns on the "over" light 70 for approximately two seconds. If "AND gate No. one" 56 is in a receptive state when the pulse is received, the gate puts out a pulse 72 which triggers monostable multivibrator No. seven 74 and monostable multivibrator No. three 76. Monostable multivibrator No. seven 74 turns on the "on target" light 76 for approximately two seconds. Monostable multivibrator No. three 76 turns on the transmitter for approximately 150 milliseconds. If "AND gate No. four" 64 is in a receptive state when the pulse is received, the gate puts out a pulse 80 which triggers the monostable multivibrator No. six 82 which turns on the "short" light 84 for approximately two seconds. In the case of a "hit," the output produced by monostable multivibrator No. three 76 when it is triggered, turns on radio transmitter 26 for about 150 milliseconds. Modulation for the radio transmitter is provided by the output of the infrared sensitive detector 87 which senses modulated infrared radiation from the tank being fired upon. Thus the frequency of the modulation applied to the radio transmitter is precisely the same as that of the modulation of the infrared radiation. All tanks are emitting modulated infrared radiation continuously but each tank uses a different modulation frequency in the band of 300 to 1,000 cycles per second in the preferred embodiment of the invention.

*Hit receiver and indicator*

Figure 4:
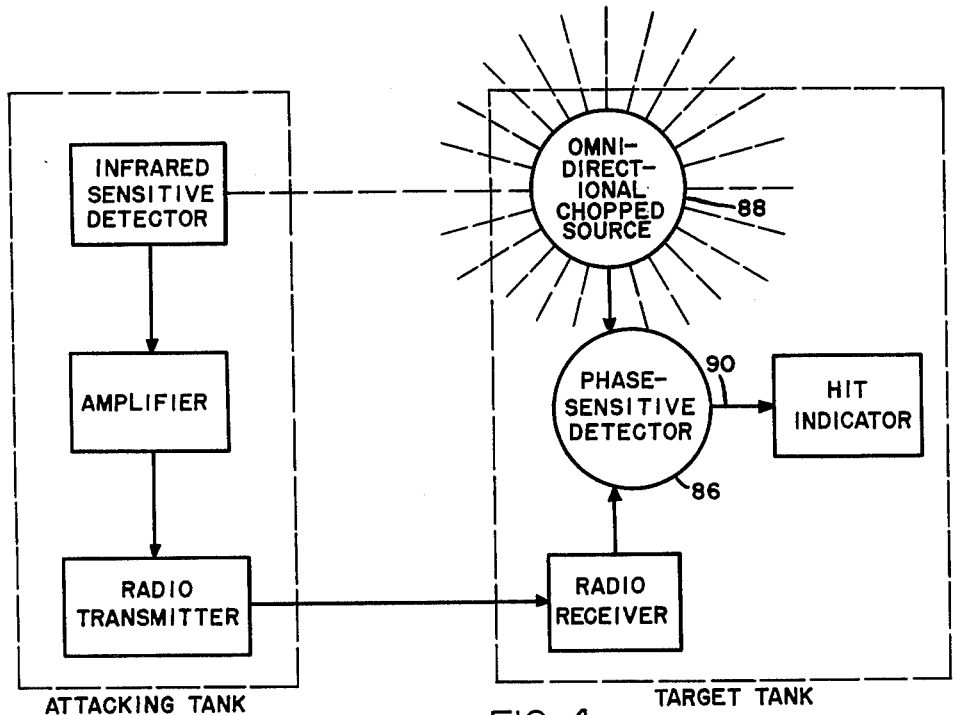
FIG. 4 is a block schematic diagram showing the omnidirectional source communication link for indicating hits and scoring.

Radio receivers in all tanks are on at all times except for the receiver in a firing tank which is off for 150 milliseconds when its transmitter is on. Thus, all tanks, except the one firing receive all radio transmissions from other tanks. The output of each radio receiver is a signal at the modulation frequency of the radio transmission. As shown in FIG. 4, this signal is applied to a phase-sensitive detector (PSD) 86 along with a reference signal provided by a photocell which views the tank's own modulated infrared source 88. The action of the phase-sensitive detector can be considered that of an instantaneous multiplier. Thus, the instantaneous output is proportional to the instantaneous product of the two input signals. With two square-wave inputs of different fundamental frequencies, the phase-sensitive detector output 90 will consist of an A.C. voltage whose frequency components are sums and differences of the odd integer multiples of the two input fundamental frequencies and will have no D.C. component. However, when the two inputs are of precisely the same frequency and in phase, the phase-sensitive detector output will consist of a D.C. level. If the phases of the two signals are not the same, the D.C. level will be lower (it becomes 0 at 90° and 270°) and in addition, there will be an A.C. voltage whose frequency components are integer multiples of twice the fundamental frequency.

The tank which has been fired upon will have precisely the same frequencies if both signals are derived from the same modulated infrared source (via a radio link in one case). This is illustrated in FIGS. 1a–1c and is shown as the target tank 18. In all other tanks the two signals will have frequencies that are different by at least 5%. Thus, the tank which has been fired upon is the only one whose phase-sensitive detector 86 will have a D.C. component at its output. The output of the phase-sensitive detector 86 is put through a low-pass filter 92 to remove any A.C. components and thereby facilitate recognition of the D.C. component. If any D.C. component is present, it will actuate a relay 94 which in turn energizes the igniter of a smoke bomb 36.

Figure 5:
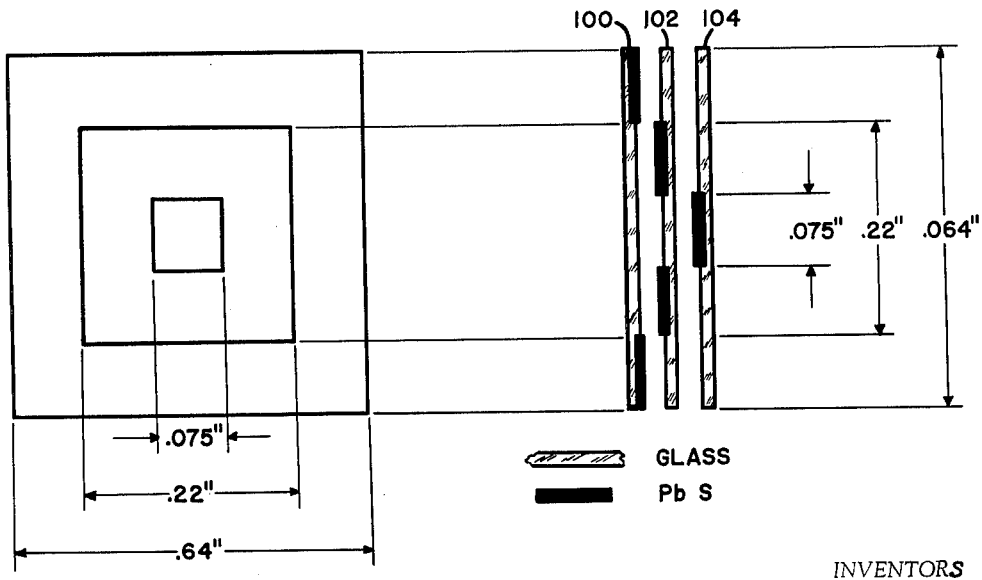
FIG. 5 is a diagram of the infrared detector.

In order for the optical communication system to operate with visual security, either infrared or ultra-violet radiation must be used. In a preferred embodiment of the invention, infrared radiation was chosen because of the high scattering of ultra-violet and the difficulty of making an ultra-violet source of invisible to young observers. A lead sulfide cell was chosen as the infrared-sensitive detector in the preferred embodiment of the invention and the transmission characteristics of the filter used with the light source were chosen so as to permit operation from 0.7 to 2.8 microns. In order to narrow the field of use sufficiently to make it unlikely to receive signals from other than the target tank, the acceptance angle of the receiving system must be varied as a function of range. It was decided to switch the acceptance angle discretely as a function of range. In a preferred embodiment of the invention, one angular field was chosen for ranges of 100 to 500 yards, a second field for ranges of 500 to 1,100 yards, and a third angular field for ranges of 1,100 to 2,500 yards. These various angular fields, in a preferred embodiment of the invention, were accommodated by three lead sulfide cells stacked one upon the other as shown in FIG. 5. The two larger cells 100 and 102 consist of rectangular lead sulfide areas with holes made by removing lead sulfide from the central area to which the next smaller cell may fit. Cell 104 is of a size corresponding to the most distant range interval.

The cells are used as follows: for close range—100 to 500 yards, all cells are connected in parallel; for intermediate range—500 to 1,100 yards, cells 102 and 104 are connected in parallel and cell A is open; for 1,100 to 2,500 yards, cell A is used alone. The cell assembly together with the associated switching and preamplifier circuits are located directly above the bore sighting assembly in the preferred embodiment of the invention. The use of cells in this manner changes the field of view as required and provides higher signal to noise ratios than could be obtained by progressive masking of a single large cell. This is due to the fact that the background noise in lead sulfide cells depends upon its area which thereby limits the signal to noise ratio. Use of small, operational lead sulfide cell areas results in lower background noise and therefore higher signal to noise ratio. Switching of the cells is accomplished in the preferred embodiment of the invention with subminiature relays which are operated by cam-operated switches on the range shaft of the input to the ballistic computer of the training device.

Thus, it is seen by the use of simple circuitry, a highly accurate tank gunnery scoring system is possible. The effectiveness of this scoring system is only limited by the range of the light flash lamp output 12 and the effectiveness of the reflector 16. In the present state of the art, the available flash lamps and reflectors permits the use of a system based upon optical radar principles which can be extended to the order of ten miles.

Obviously, many modifications and variations of the present invention are possible in the light of the above teachings. It is therefore to be understood that within the scope of the appended claims the invention may be practiced otherwise than as specifically described.

What is claimed is:
1. A tank gunnery training scoring system comprising, hit indicating means for generating a directional light beam, means for reflecting said directional light beam along its incident axis, said reflecting means being mounted on a remote target tank, means for detecting reflected light beams, said light beams detecting means being mounted adjacent to said light generating means, means for generating electrical pulse signals, said pulse generating means being operatively connected to said light detection means by said reflected light whereby said reflected light signals actuate said pulse signal generating means comprising, timing means, and comparator means, said comparator means being operatively connected to said timing means and to said pulse generating means whereby the time of travel of said light signal is compared to a preset standard voltage, indicator means, said indicator means operatively connected to said comparator means for indication of the difference between said preset standard voltage and said time of travel of said light beam, means for generating continuous-wave invisible light frequencies, said invisible light frequency means being located on said remote target tank adjacent to said remote reflector, invisible light detection means said detection means being located adjacent to said light generating means and operatively connected to said invisible light frequencies generating means, radio transmitter and antenna means, said radio transmitter and antenna means being operatively connected said invisible light detection means whereby said transmitter generates a signal in accordance with signals received by said invisible light detection means, radio receiver means, photocell detection means and phase-sensitive detector means, said receiver means and photocell detection means being remotely located on said remote target tank and operatively connected to said phase-sensitive detector means, said photocell detection means producing electrical signals in accordance with said invisible wave signal generating means, said radio receiver means producing signals in accordance with signals received from said remote radio transmitter means, said phase-sensitive detector means comparing said input signals from said radio receiver means and photocell means and providing output signals upon phase coincidence for operation of said hit indicators.

2. The combination of claim 1, and smoke bomb means and disabling signal means, said smoke bomb means being operatively connected to the outputs of said phase-sensitive detector means and operative therewith, said disabling means being also operatively connected to the output of said phase-sensitive detector means and being operative therewith, 3. The combination of claim 2 wherein said hit scoring and indicating means comprise, over indicator means, and over signal generating means, said over signal generating means comprising, AND circuit means and monostable multivibrator means and bistable multivibrator means, said AND circuit means being operatively connected to the output of said bistable multivibrator means, said monostable multivibrator means being operatively connected to the output of said AND circuit means and said indicator means being operatively connected to the output of said monostable multivibrator means, short-of-target indicator means, said short-of-target indicator means comprising a short-of-target indicator and short-of-target signal generating means, said short-of-target signal generating means comprising, monostable multivibrator means, and AND circuit means, said AND circuit means being operative with said short-of-target monostable multivibrator means and also operative with said input from said reflected light detector, said second short-of-target monostable multivibrator means being operative with said AND circuit means for generation of short-of-target signals for operation of said short-of-target indicator on-target indicator means, said on-target indicator means comprising, an on-target indicator and on-target signal generating means, said on-target signal generating means being operatively connected to said reflected light detector means and also operative with said input trigger signals from said trigger generator for generation of electrical on-target signals for operation of said on-target indicator.

4. The combination of claim 3 wherein said remote target tank reflector means comprise a retro reflector.

5. The combination of claim 4 wherein said invisible light signal detector means comprises, a combination of three concentric square surfaces, each of said concentric surfaces being of a size to fit within a square cutout in the next larger surface, and means for insulating each of said surfaces from each of the other surfaces, switching means, said switching means being connected to said light sensitive surfaces for switching one or more of said surfaces into the light detection circuitry in parallel in accordance with the range between said invisible light detecting means and the remote target tank.

6. The combination of claim 5 wherein said invisible light signal generating means comprises, means for generating modulated infrared signals and said invisible light detection means comprising, means for detecting infrared signals.

References Cited by the Examiner
UNITED STATES PATENTS 3,104,478    9/1963    Strauss et al. _____ 35—25

EUGENE R. CAPOZIO, *Primary Examiner.*